United States Patent [19]
Delacourt et al.

[11] Patent Number: 5,349,466
[45] Date of Patent: Sep. 20, 1994

[54] FREQUENCY DOUBLER INCLUDING AN ELECTRICALLY CONTROLLED OPTICAL INDEX NETWORK

[75] Inventors: Dominique Delacourt, Paris; Michel Papuchon, Villebon Palaiseau; Eric Lallier, Levallois; Florence Armani, Orsay, all of France

[73] Assignee: Thomson-CSF, Puteaux, France

[21] Appl. No.: 178,359

[22] Filed: Jan. 6, 1994

Related U.S. Application Data

[63] Continuation of Ser. No. 988,762, Dec. 10, 1992, abandoned.

[30] Foreign Application Priority Data

Dec. 10, 1991 [FR] France .............................. 91 15277

[51] Int. Cl.$^5$ .............................................. G02F 1/35
[52] U.S. Cl. .................................... 359/326; 385/122
[58] Field of Search ................................ 372/20–22; 359/326–332; 385/11, 122

[56] References Cited

U.S. PATENT DOCUMENTS

| | | | |
|---|---|---|---|
| 3,611,231 | 10/1971 | Burke | 372/10 |
| 4,865,406 | 9/1989 | Khanarian et al. | 385/122 |
| 4,971,416 | 11/1990 | Khanarian et al. | 359/332 X |
| 5,022,729 | 6/1991 | Tamada et al. | 385/122 X |
| 5,036,220 | 7/1991 | Byer et al. | 359/326 X |
| 5,058,970 | 10/1991 | Schildkraut et al. | 359/328 |
| 5,113,469 | 5/1992 | Hatakoshi et al. | 385/122 |
| 5,157,754 | 10/1992 | Bierlein et al. | 385/122 |

FOREIGN PATENT DOCUMENTS

| | | |
|---|---|---|
| 442779 | 8/1991 | European Pat. Off. |
| 2385114 | 10/1978 | France |
| WO90/04807 | 5/1990 | PCT Int'l Appl. |

OTHER PUBLICATIONS

Blistanov, et al., Soviet Journal of Quantum Electronics, vol. 16, No. 12, Dec. 1986, pp. 1678–1679 "Modulation and conversion of light in lithium niobate crystals with a regular domain structure".

Balakshii, et al., Soviet Journal of Quantum Electronics, vol. 8, No. 9, Sep. 1978, pp. 1078–1081 "Amplitude modulation of light by diffraction on $Ba_2NaNb_5O_{15}$ crystal domains".

Applied Physics Letters, vol. 34, No. 1, Jan. 1979, pp. 60–62, M. Uesugi, et al., "Electric Field Tuning of Second-Harmonic Generation in a Three-Dimensional $LiNbO_3$ Optical Waveguide".

Applied Physics Letters, vol. 58, No. 24, Jun. 1991, pp. 2732–2734, K. Mizuuchi, et al., "Second-Harmonic Generation of Blue Light in a $LiTaO_3$ Waveguide".

Applied Physics Letters, vol. 57, No. 20, Nov. 1990, pp. 2074–2076, C. J. van der Poel, et al., "Efficient Type I Blue Second-Harmonic Generation in Periodically Segmented $KTiOPO_4$ Waveguide".

Primary Examiner—John D. Lee
Attorney, Agent, or Firm—Oblon, Spivak, McClelland, Maier & Neustadt

[57] ABSTRACT

The device according to the invention is a frequency doubler comprising an optical index network which can be electrically controlled by two continuous electrodes, the network being created by the presence of (+P) polarization domains periodically separated by (−P) polarization domains, the electrodes being used to electrooptically compensate for variations in the index between the (+P) domains and (−P) domains.

27 Claims, 2 Drawing Sheets

FREQUENCY DOUBLER INCLUDING AN ELECTRICALLY CONTROLLED OPTICAL INDEX NETWORK

This application is a continuation of application Ser. No. 07/988,762, filed on Dec. 10, 1992, now abandoned.

BACKGROUND OF THE INVENTION

This invention applies to diffraction networks frequently used in optical applications particularly for light coupling within a guide. The periodic function of the network enables it to generate several orders, diffracted in different directions, from a single incident wave; this property can be used to phase-match waves propagated outside the guide and those propagating in the guide modes. When the network is produced by periodically varying the index, the efficiency with which the light energy in the incident wave is coupled to the diffraction orders depends directly on the amplitude of the variation. It is known that the efficiency of the network can be modified by dynamically varying the refractive index of the material used. To achieve this, one solution employed in the prior art is to use the electrooptical effect to electrically vary the network index, the periodic function of the index to be modified then being determined by rows of interleaved electrodes which create, within a material capable of generating electrooptical effects and with an optical index n, zones with index $n+\Delta n$ and zones with index $n-\Delta n$ using electrodes held at potential $+V$ and electrodes held at potential $-V$.

FIG. 1 illustrates this type of structure in which it is possible to generate, by applying field $\xi$, zones with index $n+\Delta n$ separated from zones with index $n-\Delta n$ by zones with index n.

Typically, this can be a wave guide produced by known techniques within a lithium niobate crystal whose optical axis c is perpendicular to the plane of the guide. If it is assumed that the variation in index $\Delta n$ is solely due to the field applied by the interleaved electrodes, which is colinear with axis c, the network of optical indices shown in FIG. 1 is obtained.

However, the major drawback to such a network of optical indices lies in the complexity of the electrodes required, which creates problems due to peak effects between electrodes, these effects leading to high voltages and the destruction of the guide or the electrodes themselves. Moreover, a complex electrode structure is an impediment to using the network at very high frequencies.

SUMMARY OF THE INVENTION

The device according to the invention is a network of optical indices which uses uniform continuous electrodes and a material in which polarization reversals can be previously induced by various techniques.

It is known that, in certain materials, it is possible to induce local reversals in the ferroelectric domains by special treatments. This then gives a material containing $+P$-polarized zones and $-P$-polarized zones with opposite second-order non-linear susceptibilities (these non-linear susceptibilities causing, in particular, generation of second harmonics and the electrooptical effect). Consequently, when $+P$-polarized zones and $-P$-polarized zones are produced and an electrical field is applied to these zones, we obtain domains with electrooptical coefficients $+r$ and $-r$ capable of inducing index variations of $+\Delta n$ and $-\Delta n$ respectively since r and $\Delta n$ are linked by the following formula:

$$Dn = \frac{1}{2} n^3 r\xi$$

where
n is the optical index of the material
r is the electrooptical coefficient
$\xi$ is the electrical field applied to the material.

The advantages of using a continuous electrode and a material containing local reversals in polarization lies in the fact that there is no need for a permanent network such as that produced with interleaved electrodes which, even when no voltage is applied, affect the optical properties of the underlying material (M). It is important to note that the polarization reversals have very little effect on the optical index of the material (M) (depending on the polarization reversal process used) and that the variation in index required to form the network is generated by the electrooptical effect. Consequently, when no voltage is applied, the material is simply covered by an electrode and the assembly is virtually completely homogenous.

More precisely, the device according to the invention is a frequency doubler comprising a network whose optical index can be electrically controlled and which is produced from a material (M), whose ferroelectric polarization (P) is locally reversed periodically to form alternating $(+P)$ domains and $(-P)$ domains, and at least two electrodes (E), one of which, at least, lies opposite the $(+P)$ domains and the $(-P)$ domains, these electrodes being used to electrooptically compensate for index variations between the $(+P)$ domains and the $(-P)$ domains.

Material (M) is, preferably, a lithium niobate crystal, in which ferroelectric polarization reversals can be produced by locally diffusing titanium onto one of the crystal faces. However, material (M) can also be a crystal of lithium tantalate or the oxide $KTiOPO_4$.

Again, it can be a polymer material containing strongly polar intermolecular or intramolecular groups that can be orientated by an electric field. In this case, it is possible, using interleaved electrodes, to apply a preliminary electric field and thus induce the formation of $(+P)$ and $(-P)$ domains, subsequently removing these interleaved electrodes and replacing them by a continuous electrode.

The invention is also a double intra-cavity triggered laser which uses a double structure and in which, alternately, a voltage $(V_1)$ is applied to the electrodes to generate losses and a voltage $(V_2)$ is applied to the electrodes to electrooptically compensate for variations in the index between $(+P)$ and $(-P)$ domains.

BRIEF DESCRIPTION OF THE DRAWINGS

The invention will be better understood and other advantages will become clear upon reading the following description and referring to the appended figures of which.

DETAILED DESCRIPTION OF THE INVENTION

The electrically controlled optical index network used in the invention requires a material (M) in which it is possible to induce polarization reversals by suitable treatment. A lithium niobate crystal satisfies this requirement very well. The non-linear optical effects it generates are well-known and it has been found that locally diffusing titanium on one of the crystal faces (more precisely, crystal face C+) causes reversal of the ferroelectric domains.

Figure 1:
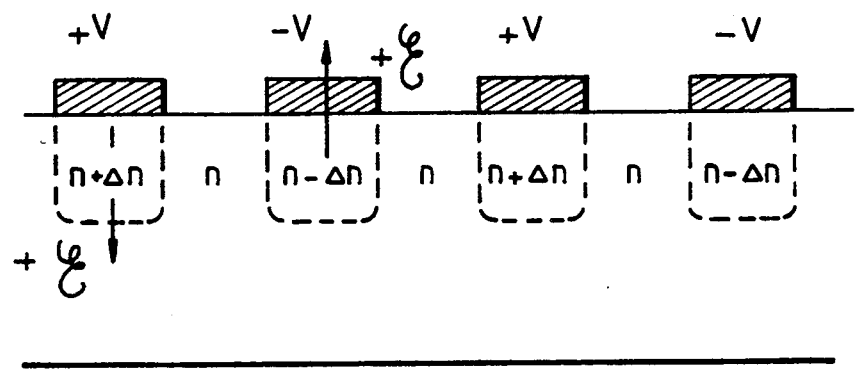
FIG. 1 represents an optical index network according to the prior art, using interleaved electrodes.
Figure 2:
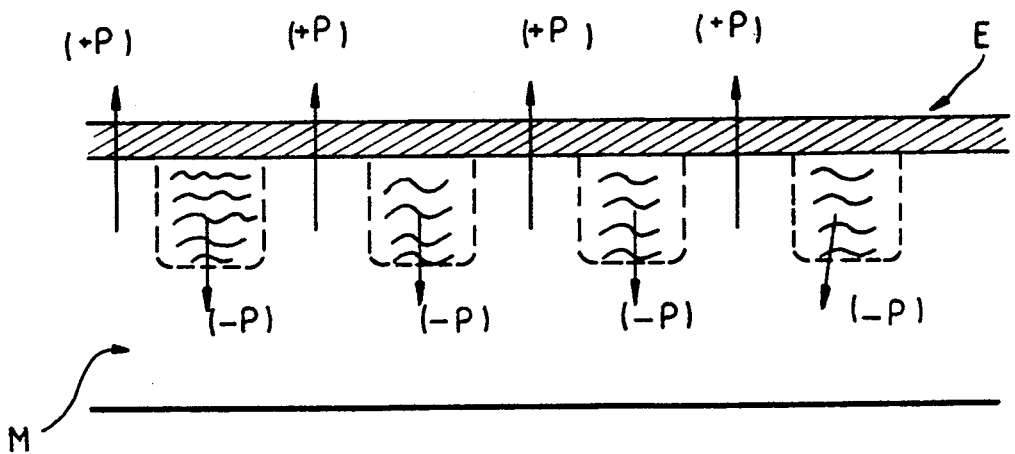
FIG. 2 represents an embodiment of the optical index network according to the invention, produced by diffusing titanium into a lithium niobate crystal.

It is therefore possible, using known photolithographic techniques, to produce a network of titanium strips, perpendicular to the plane of material (M) as shown on FIG. 2, in a lithium niobate crystal. The strips of titanium which cause the polarization reversals are represented by areas marked ($-P$), separated by lithium niobate represented by areas marked ($+P$). To use the electrooptical effect to introduce variations in index, an electrode E is deposited on all the ($+P$) and ($-P$) domains, lying opposite these domains, and another electrode is produced on material (M) (this electrode can be on a surface containing no reversal in ferroelectric domains) to allow local application of an electric field parallel to the long center line of the ($-P$) polarization strips.

Figure 3:
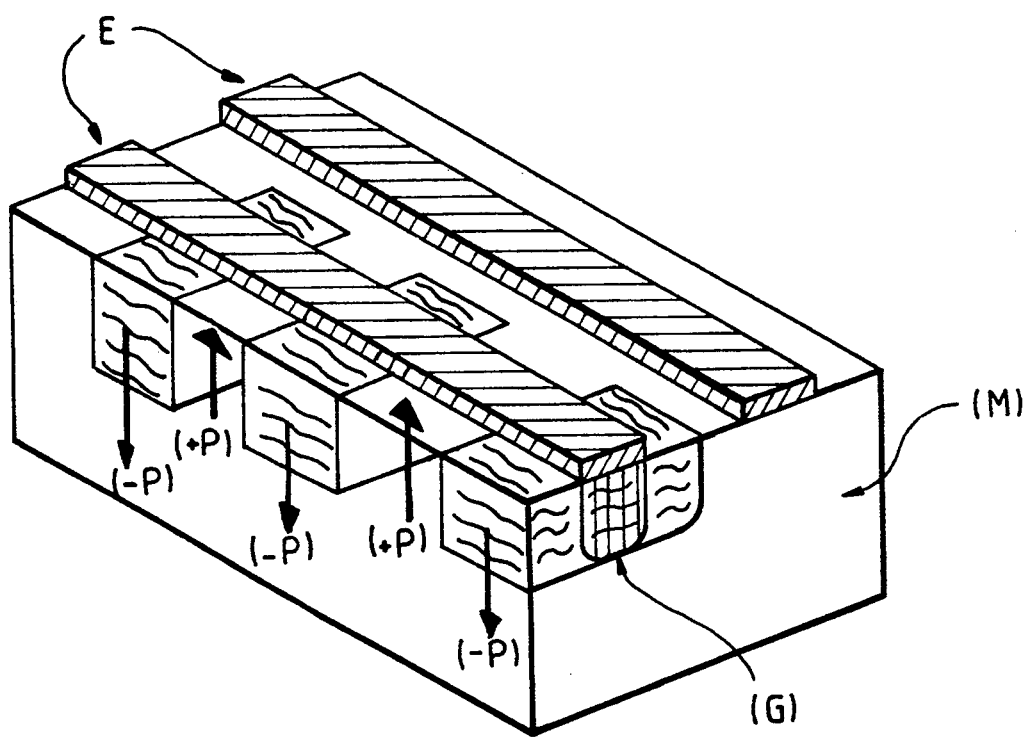
FIG. 3 represents an example of a waveguide including a diffraction network structure according to the invention, this guide being induced in material (M) by prior treatment.

Using existing lithographic techniques and lithium niobate technology, it is possible to produce reversal networks with a pitch of approximately 2 $\mu$m. Titanium is diffused at a temperature close to 1000° C. and it is then possible to create a two-dimensional guide at the diffraction network level by proton exchange of lithium Li+ ions at roughly 200° to 300° C.; the insertion of the guide (G) in the network is represented on FIG. 3. This type of structure is particularly advantageous and allows an electric field to be applied parallel to the crystal center line C. Consequently, when no voltage is applied across the electrodes, the network is capable of transmitting, in its entirety, an incident beam received on the edge. However, when a voltage is applied, it creates a network of indices so that the incident wave is diffracted into several orders with different angles of diffraction. This possibility of diffracting the guided light results in a reduction in the guided light energy, the overall efficiency depending on the length of the interaction between the guide and the network created which itself depends on the variation in the index induced by the voltage applied. This structure therefore makes it possible to modulate diffraction losses from a guided wave and, consequently, to modulate the wave amplitude. A lithium niobate crystal doped with neodymium $Nd^{3+}$ or erbium $Er^{3+}$ ions, capable of producing a laser effect, can advantageously be used. Local ferroelectric polarization reversals are induced and the wave guide section is introduced using special treatments described previously. The inlet and outlet faces of the guide produced can then be treated to allow oscillation of a wave generated by the optical pumping generally obtained with a laser diode. It is then possible, using the optical index network, to operate a conventional solid laser in the triggered ("Q-switch") mode by modulating the guided wave amplified by the laser effect.

In the case of frequency doublers, where an optical configuration must be found to phase-match the wave at frequency $\omega$, propagating with a wave vector $k_\omega$ to the wave at frequency $2\omega$ propagating with a wave vector $k_2$, these wave vectors depending on the optical indices as shown in the following equations:

$$k_\omega = 2\pi n_\omega / \lambda_{107}$$

$$k_{2\omega} = 2 \times 2\, n_{2\omega}/\lambda_\omega$$

where
 $n_\omega$ is the material index at frequency $\omega$
 $n_{2\omega}$ is the material index at frequency $2\omega$
 $\lambda_\omega$ is the wavelength at frequency $\omega$ In general, $n_{2\omega}$ is different to $n_\omega$ and the phase difference between the incident wave and the harmonic wave created reduces the conversion efficiency to an unacceptable extent. The term "coherence length" $L_c$ describes the length after which the phase-shift is $\pi$. With this definition of $L_c$, $(k_{2\omega} - 2k_\omega)L_c = \pi$ where $L_c = \pi_w/4(n_{2\omega} - n_\omega)$.

One method of avoiding this problem is to introduce a periodic interference which artificially matches the phase, still known as quasi-phase matching, which implies satisfying the condition $k2_{2\omega} - 2k_\omega = mK$ where m is an integer and $K = 2\pi/$"where" is the pitch of the network created.

In particular, it is possible to create this network by inducing a periodic polarization reversal and, more especially, if a lithium niobate crystal, known for its high-performance in generating second harmonics, is used, by diffusing titanium. The resultant variation in the index between ($+P$) domains and ($-P$) domains is certainly small but, nonetheless, even this small variation in index creates slight diffraction of the pumped waves $O_p$ and the harmonic (double the frequency) $O_h$ leading to a reduction in the wave $O_p$ and $O_h$ efficiencies. If we take the index of the ($+P$) domains as n and the index of the ($-P$) domains as $n + \Delta n$ when no field is applied, it is possible to compensate for this variation in index $\Delta n$ by applying an electric field $\xi$ capable of creating a variation $\Delta n'$:

In ($+P$) domains, the index becomes $n + \Delta n'$
In ($-P$) domains, the index becomes $n + \Delta n - \Delta n'$
The aim is, therefore, to achieve The aim is, therefore, to achieve $$n + \Delta n' = n + \Delta n - \Delta n'$$

$$\Delta n' = \frac{\Delta n}{2}$$

If n is approximately $10^{-4}$ (the case of titanium diffused into a lithium niobate crystal), only a few volts need be applied to compensate for the small variation in index due to the periodical arrangement of the ($+P$) and ($-P$) domains.

The electrically controlled index network used in the invention can also be obtained using other organic crystals such as $LiTaO_3$ or $KTiOPO_4$. In the case of lithium tantanate, the polarization reversal can be obtained by proton exchange at approximately 600° C. or by applying an electric field, using interleaved electrodes which can later be deleted, at a temperature close to the Curie transition temperature (620° C.).

In the case of $KTiOPO_4$, the polarization reversal can be obtained by replacing $K+$ ions by $Rb+$ ions in the presence of barium oxide at approximately 350° C.

It is also possible to produce the network used in the invention with polymers containing highly polarized active intermolecular or intramolecular groups. The (+P) domains and (−P) domains can then be produced by applying an electric field, using interleaved electrodes which can subsequently be replaced by continuous electrodes to achieve a network according to the invention.

What is claimed is:

1. A frequency doubler comprising:
   a material having a locally reversed ferroelectric polarization to create alternating (+P) domains and (−P) domains;
   a first continuous electrode formed on the material above the alternating (+P) domains and (−P) domains for inducing an electric field in the alternating (+P) domains and (−P) domains; and
   a second electrode formed on the material.

2. The frequency doubler according to claim 1, wherein the material is a lithium niobate crystal.

3. The frequency doubler according to claim 2, wherein the ferroelectric polarization reversals are obtained by local diffusion of titanium into faces of the lithium niobate crystal.

4. The frequency doubler according to claim 1, wherein the material is a lithium tantalate crystal.

5. The frequency doubler according to claim 4, wherein the polarization reversals are obtained by proton exchange of $L_i+$ ions.

6. The frequency doubler according to claim 1, wherein the material is $KTiOPO_4$.

7. The frequency doubler according to claim 6, wherein the polarization reversals are produced by replacing K+ ions by Rb+ ions in the presence of barium oxide.

8. The frequency doubler according to claim 1, wherein the material is a polymer containing intermolecular or intramolecular groups which can be oriented by an electrical field.

9. The frequency doubler according to claim 8, wherein the polarization reversals are obtained by applying an electric field through an interleaved set of electrodes deposited on the surface of the material, this set of electrodes being subsequently deleted and replaced by the first continuous electrode.

10. A frequency doubler comprising:
    a material having a locally reversed ferroelectric polarization to create alternating (+P) domains and (−P) domains;
    a first continuous electrode formed directly on the material above the alternating (+P) domains and (−P) domains to contact the alternating (+P) domains and (−P) domains; and
    a second electrode formed on the material.

11. The frequency doubler according to claim 10, wherein the material is a lithium niobate crystal.

12. The frequency doubler according to claim 11, wherein the ferroelectric polarization reversals are obtained by local diffusion of titanium into faces of the lithium niobate crystal.

13. The frequency doubler according to claim 10, wherein the material is a lithium tantalate crystal.

14. The frequency doubler according to claim 13, wherein the polarization reversals are obtained by proton exchange of Li+ ions.

15. The frequency doubler according to claim 10, wherein the material is $KTiOPO_4$.

16. The frequency doubler according to claim 15, wherein the polarization reversals are produced by replacing K+ ions by Rb+ ions in the presence of barium oxide.

17. The frequency doubler according to claim 10, wherein the material is a polymer containing intermolecular or intramolecular groups which can be oriented by an electrical field.

18. The frequency doubler according to claim 17, wherein the polarization reversals are obtained by applying an electric field through an interleaved set of electrodes deposited on the surface of the material, this set of electrodes being subsequently deleted and replaced by the first continuous electrode.

19. A frequency doubler comprising:
    a material having a locally reversed ferroelectric polarization to create alternating (+P) domains and (−P) domains;
    a first continuous electrode formed on a first face of the material above the alternating (+P) domains and (−P) domains; and
    a second electrode formed on the first face of the material, the second electrode being parallel to the first continuous electrode.

20. The frequency doubler according to claim 19, wherein the material is a lithium niobate crystal.

21. The frequency doubler according to claim 20, wherein the ferroelectric polarization reversals are obtained by local diffusion of titanium into faces of the lithium niobate crystal.

22. The frequency doubler according to claim 19, wherein the material is a lithium tantalate crystal.

23. The frequency doubler according to claim 22, wherein the polarization reversals are obtained by proton exchange of Li+ ions.

24. The frequency doubler according to claim 19, wherein the material is $KTiOPO_4$.

25. The frequency doubler according to claim 24, wherein the polarization reversals are produced by replacing K+ ions by Rb+ ions in the presence of barium oxide.

26. The frequency doubler according to claim 19, wherein the material is a polymer containing intermolecular or intramolecular groups which can be oriented by an electrical field.

27. The frequency doubler according to claim 26, wherein the polarization reversals are obtained by applying an electric field through an interleaved set of electrodes deposited on the surface of the material, this set of electrodes being subsequently deleted and replaced by the first continuous electrode.

* * * * *